United States Patent [19] [11] Patent Number: 4,576,853
Vaughn et al. [45] Date of Patent: Mar. 18, 1986

[54] MULTI-LAYER PLEATED TEXTILE FIBER PRODUCT

[75] Inventors: Edward A. Vaughn, Clemson, S.C.; Michael L. Clymin, Harrisburg, Pa.

[73] Assignee: C. H. Masland & Sons, Carlisle, Pa.

[21] Appl. No.: 626,468

[22] Filed: Jun. 29, 1984

Related U.S. Application Data

[63] Continuation-in-part of Ser. No. 550,458, Nov. 10, 1983, abandoned.

[51] Int. Cl.$^4$ .............................................. B32B 3/28
[52] U.S. Cl. ................................. 428/181; 428/212; 428/217; 428/218; 428/284; 428/297; 428/298
[58] Field of Search ............... 428/212, 217, 218, 181, 428/213, 297, 284, 186, 298

[56] References Cited

U.S. PATENT DOCUMENTS

| 4,089,783 | 5/1978 | Holyoak | 428/181 |
| 4,310,579 | 1/1982 | Gaydecki | 428/181 |
| 4,439,477 | 3/1984 | Kiss | 428/181 |

FOREIGN PATENT DOCUMENTS

| 454075 | 1/1949 | Canada | 428/181 |
| 1148942 | 4/1969 | United Kingdom | 428/181 |

Primary Examiner—James J. Bell
Attorney, Agent, or Firm—Scrivener Clarke Scrivener & Johnson

[57] ABSTRACT

A product formed of a plurality of unstable layers of textile fiber pleated together with both the layers and the pleats in close contact, forming a stable body the upper and lower surfaces of which are formed by the folds between the pleats.

19 Claims, 6 Drawing Figures

MULTI-LAYER PLEATED TEXTILE FIBER PRODUCT

This application is a continuation-in-part of application Ser. No. 550,458, filed Nov. 10, 1983 now abandoned.

SUMMARY OF THE INVENTION

A structurally stable product is provided which is formed of a plurality of layers of textile fiber none of which has structural stability, which are pleated together with the layers of each pleat in close contact and contiguous pleats in close contact, the ends of the pleats forming the sides of the product and the folds between the pleats forming the upper and lower surfaces of the product. In certain forms of the product at least one of the layers has properties different from those of another of the layers.

DESCRIPTION OF A PREFERRED EMBODIMENT OF THE INVENTION

The invention provides a product formed of a plurality of structrually unstable layers of textile fiber which are pleated together to provide a free standing structurally stable body which has utility itself and from which a variety of useful products may be made.

In the preferred method of forming the product a plurality of generally flat layers each composed of continuous or discontinuous textile fibers such as polyester fiber or a textile fiber product, none of which has substantial structural stability, are arranged in superposed relation and then pleated together with the layers of each pleat in close contact with each other and with contiguous multi-layered pleats in close contact with each other, thus forming a product comprising compacted multi-layered pleats which has structural stability and utility in many arts and industries. The product itself has many uses, and products formed from it may take any desired geometric configuration depending on the designed use. For best results we have found that the pleating operation is performed by utilizing the Libeltex-Limatex process and machine described and claimed in the United States patent to Periera U.S. Pat. No. 4,111,733. The close contact between the layers of each pleat, and the close contact between contiguous pleats, may be produced by applying pressure in the pleating operation and the Libeltex-Limatex process and machine is particularly effective in producing these pressures.

Figure 1:
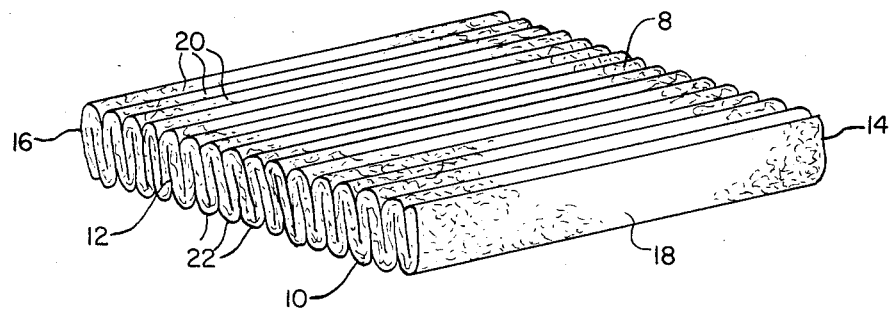
FIG. 1 is a perspective view of a piece of material provided by the invention.
Figure 2:
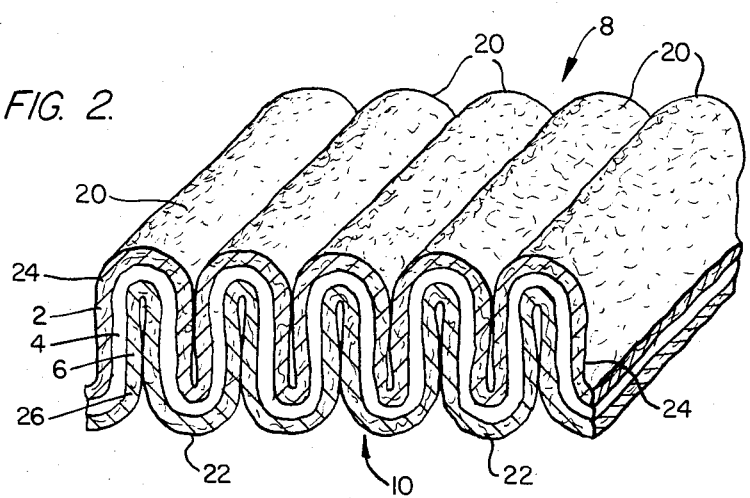
FIG. 2 is an enlarged partial perspective view of the material disclosed in FIG. 1.

In FIGS. 1 and 2 of the drawings there is disclosed the preferred form of the invention, which is a composite body formed of a plurality of layers 2, 4, 6 of fluffy textile fiber which have been pleated together to form a body having upper and lower surfaces 8, 10, respectively, side walls 12, 14 and end walls 16, 18. The multi-layered pleats extend in alternately different directions between reverse folds 20, 22, the upper surface 8 being formed by the reverse folds 20 which connect the parts 24 of the layer 2, while the lower surface 10 is formed by the reverse folds 22 which connect the parts 26 of layer 6. The side walls 12, 14 are formed by the ends of the multi-layer pleats and the end walls 16, 18 are formed by layers 24 which form part of the layer 2. The layers 2, 4, 6 of each pleat are in close contact with each other and contiguous multi-layer pleats are also in close contact with each other, thereby imparting structural stability to the product. While three layers are shown in the drawings it will be understood that within the scope of the invention the product may comprise any number of layers which is more than one.

The described three-dimensional multi-layer pleated product, with its layers and pleats in close contact, forms a composite structurally stable fiber product which has utility itself and which may be formed in the pleating process into large blocks from which ultimate products may be cut or otherwise formed.

The fluffy textile fiber material of which the layers ae formed lends itself to various processes of treatment, and in further accordance with the invention at least one of the layers may be constructed or treated to have a characteristic or function different from that of one or more of the other layers in the finished product, the different utilities of the layers 2, 6 being illustrated in FIG. 2 by different lining and hatching, and it will be understood that in the broad concept disclosed in that figure no specific structure or function is ascribed to these two layers as these will be determined by those skilled in the relevant arts at the time the finished product is designed. Embodiments of the invention providing differential constructions or treatments of layers of the product are described in this specification and claimed as part of the invention.

Figure 3:
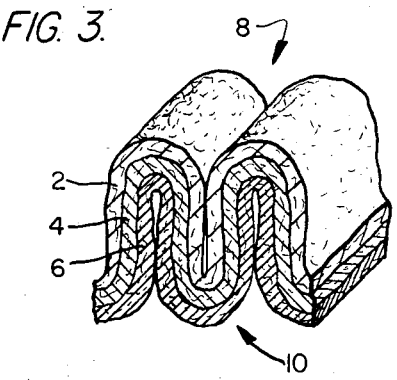
FIGS. 3 and 4 are partial side views of embodiments of the invention.

Thus, in accordance with this part of the invention the layers may have different degrees of porosity, resilience, liquid or gas retention, or rigidity, and may be constructed or treated differentially to provide any of these different characteristics in any desired sequence from layer 2 whose folds form the upper surface of the product through the intermediate layer or layers to the layer 6 whose folds form the lower surface of the product. A product comprising layers having progressively any one of these characteristics is disclosed in FIG. 3, in which the degree of the variable characteristic is illustrated by the density of shading.

Thus, the product provided by the invention may have layers of different porosities, and this may be accomplished by making the layers 2, 4, 6 of textile fiber of 1½ denier, 6 denier and 15 denier respectively, thereby progressively reducing the porosity from the upper surface 8 to the lower surface 10.

The layers of the product may have different degrees of resilience, and this may be accomplished by varying the cross sectional shapes of the textile fibers wich are used to form the respective layers, the degree of resilience being directly proportional to the fiber cross-sectional shape distribution and the void space between fibers. It has been found that a circular fiber cross section produces a layer of high resilience, an oval cross section produces an intermediate degree of resilience, and a rectangular cross section produces minimum resilience.

In a further embodiment of the invention a pleated multi-layer product is structurally stabilized by incorporating binder fiber in less than all of the layers so that when heat is applied to the pleated product the treated layers form a stable body upon cooling, thereby maintaining the pleated shape and overall configuration of the product. In a modification of this form of the invention a layer may also be impregnated with a foam latex or other material which will add strength and rigidity.

The invention also provides a pleated textile fiber product in which at least one of the layers is rigid. For example, in a product comprising three layers the outer layer may contain material such as calcium sulfate which, when water is applied, causes that layer to become rigid when dry. This form of the invention is useful for many purposes, including the provision of a product having a rigid part providing a handle for the rest of the product. However, any layer may be treated as described and the product sold in that condition.

Different degrees of rigidity in the layers may be produced by making them of textile fibers having different modulus, whereby they will have different resistance to deformation. Further, a condition known as reversible rigidity may be imparted to any layer of the product by treating it with a compound or compounds under specific temperature and PH conditions and subsequently subjecting it to a fluid which will upon drying impart rigidity and after which, when treated with a second fluid, will impart flexibility to the layer.

Different liquid or gas retention characteristics may be built into the layers of the product by selecting textile fibers of different deniers or cross sectional shapes, so that the degree of retention is proportional to the volume or distribution of void space between fibers.

Figure 4:
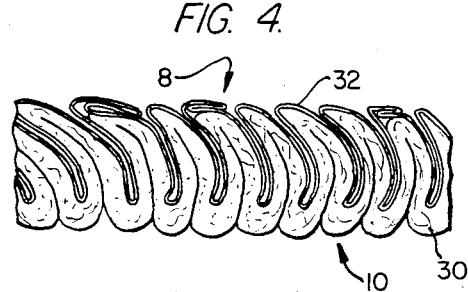

In FIG. 4 there is disclosed a multi-layer product provided by the invention comprising an outer layer 30 which contains binder fiber. This layer and a tissue paper sheet 32 are superimposed in their flat conditions with the tissue paper sheet outside of and resting on the outer layer, after which the assembled parts are simultaneously pleated and then heated, causing the sheet to adhere to the adjacent layer by melting and subsequent cooling of the binder fiber.

Figure 5:
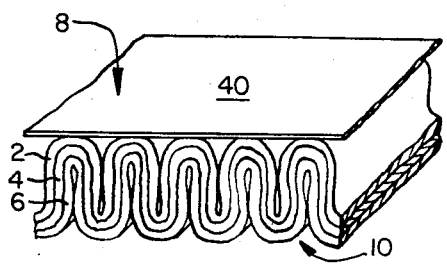
FIGS. 5 and 6 are partial perspective views of other embodiments of the invention.

Means are provided by the invention for holding the layers in pleated configuration, and one form which such means may take is disclosed in FIG. 5 and comprises three simultaneously pleated layers 2, 4, 6 and a flat non-woven sheet 40 formed of a material which melts when heated, such as the materials marketed under the trademarks Sharnet and Bostik, which is superposed in flat condition on the upper or lower surface of the pleated product, whereby upon the application of heat the sheet 40 melts and hardens on cooling to form a semi-stiff coating sheet on the surface, holding the layers in their pleated configuration and preventing separation of the pleats adjacent the adhesed sheet. In a modified form of this embodiment a sheet of non-woven material, plastic film or other laminant is laid on one or both of the surfaces of the pleated product and connected to it by hot melt glue, Sharnet, Bostik, latex or other suitable material.

Figure 6:
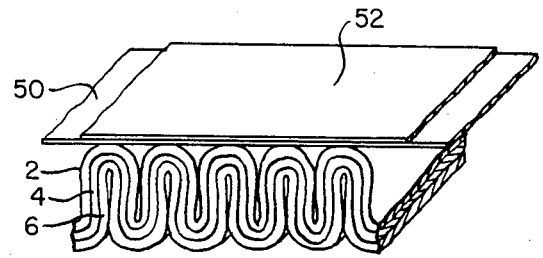

A further pleated product provided by the invention is disclosed in FIG. 6 in which a flat non-woven adhesive sheet 50, which may be Bostik, is placed on the upper or lower surface of the pleated product and a flat sheet 52 of porous non-woven material is placed on sheet 50. When this composite product is heated the sheet 50 melts and adheres the porous sheet 52 to the pleated body.

It will be understood by those skilled in the arts to which the invention relates that many different embodiments and variations of the invention may be made without departing from its spirit and scope.

We claim:

1. A three dimensional structurally stable product comprising a plurality of structurally unstable textile fiber layers pleated together with the layers of each pleat in close contact and with contiguous multi-layer pleats in close contact, the ends of the pleats forming the sides of the product and the folds between pleats forming the upper and lower surfaces of the product.

2. The product according to claim 1, in which the layers have different porosities.

3. The product according to claim 2, in which the layers are formed of fibers of different deniers.

4. The product according to claim 1, in which the layers have different degrees of resilience.

5. The product according to claim 3 in which the layers have different total void spaces.

6. The product according to claim 4 in which the layers are formed of fibers having different cross sectional shapes.

7. The product according to claim 1, in which the layers have different degrees of rigidity.

8. The product according to claim 7, in which the layers are formed of fibers of different stiffness.

9. The product according to claim 1, in which the layers have different liquid retention characteristics.

10. The product according to claim 9, in which the layers have different total void spaces.

11. The product according to claim 9, in which the layers are formed of fibers having different cross sectional shapes.

12. The product according to claim 1, in which the layers have different gas retention characteristics.

13. The product according to claim 1, in which at least one layer contains binder fibers whereby stability is imparted to that layer when heated.

14. The product according to claim 1, in which at least one layer is impregnated with a substance which when moistened with water causes the layer to become rigid when dried.

15. The product according to claim 1, in which one layer contains binder fibers and an adjacent layer is a sheet which becomes adhesive when heated whereby pleating and heating causes the sheet to adhere to the adjacent layers.

16. The product according to claim 1, in which a flat sheet of material which melts under heat is positioned on one of the opposite surfaces and is united to the surface by heating.

17. The product according to claim 1, having in addition an unwoven sheet of material which melts under heat positioned between two adjacent layers for connecting them upon heating.

18. The product according to claim 1, having a layer of unwoven material positioned on one of the outer surfaces of the product and adhered to it.

19. The product according to claim 1, having in addition a flat sheet of heat activated adhesive material on an outer surface of the product, and a flat sheet of porous unwoven material on the upper surface of the sheet of heat activated adhesive material, whereby upon heating and cooling the sheet of porous unwoven material will be adhered to the product.

* * * * *